(12) United States Patent
Nakamura et al.

(10) Patent No.: US 8,684,848 B2
(45) Date of Patent: Apr. 1, 2014

(54) SHAFT COUPLING APPARATUS

(75) Inventors: Yuki Nakamura, Kariya (JP); Kunihito Ando, Okazaki (JP); Nobuhiko Yoshioka, Anjo (JP); Takahiro Naganuma, Kariya (JP); Tomoaki Kawabata, Takahama (JP)

(73) Assignees: Advics Co., Ltd, Kariya, Aichi-Pref. (JP); Denso Corporation, Kariya, Aichi-Pref. (JP)

( * ) Notice: Subject to any disclaimer, the term of this patent is extended or adjusted under 35 U.S.C. 154(b) by 144 days.

(21) Appl. No.: 13/235,100

(22) Filed: Sep. 16, 2011

(65) Prior Publication Data

US 2012/0070222 A1    Mar. 22, 2012

(30) Foreign Application Priority Data

Sep. 20, 2010  (JP) ................. 2010-210301

(51) Int. Cl.
*F16D 3/48*    (2006.01)

(52) U.S. Cl.
USPC ......................................... 464/137; 403/292

(58) Field of Classification Search
USPC ............ 403/292–298, 300–302, 306; 464/50, 464/137, 138, 182
See application file for complete search history.

(56) References Cited

U.S. PATENT DOCUMENTS

| | | | | | |
|---|---|---|---|---|---|
| 2,069,367 | A | * | 2/1937 | Hollander | ................. 384/297 X |
| 2,219,519 | A | * | 10/1940 | Fabrin | ....................... 384/297 X |
| 3,473,261 | A | * | 10/1969 | Sheckells | ................. 464/182 X |
| 6,752,306 | B2 | * | 6/2004 | Okada | ..................... 384/297 X |
| 7,261,637 | B2 | * | 8/2007 | Tokuoka et al. | .......... 464/138 X |
| 7,462,105 | B2 | * | 12/2008 | Lattin | ...................... 464/137 X |
| 2010/0190560 | A1 | * | 7/2010 | Jaworowicz et al. | |

FOREIGN PATENT DOCUMENTS

| | | |
|---|---|---|
| GB | 1056687 | 1/1967 |
| JP | 2000-346086 A | 12/2000 |
| JP | 2006-220251 A | 8/2006 |
| JP | 2007-154944 A | 6/2007 |

OTHER PUBLICATIONS

Japanese Office Action issued on Dec. 10, 2013, by the Japan Patent Office in corresponding Japanese Patent Application No. 2010-210301, and an English Translation of the Office Action. (3 pages).

* cited by examiner

*Primary Examiner* — Gregory Binda
*Assistant Examiner* — Josh Skroupa
(74) *Attorney, Agent, or Firm* — Buchanan Ingersoll & Rooney PC

(57) ABSTRACT

A shaft coupling apparatus includes a cylindrically-shaped hole provided on a leading end surface of a shaft, the hole having a central axis that is different from a rotational central axis of the shaft, and a cylindrically-shaped hole is provided on a leading end surface of a shaft, the hole having a central axis that is different from a rotational central axis of the shaft. The shafts are coupled by pressure fitting a cross-sectionally circular pin in the hole and by loosely fitting the pin in the hole, the pin corresponding to an inner diameter of the hole and the hole.

7 Claims, 5 Drawing Sheets

SHAFT COUPLING APPARATUS

TECHNICAL FIELD

The present invention relates to a shaft coupling apparatus in which two shafts (rotating shafts) are coaxially coupled. For example, the present invention is preferably applied to a coupling apparatus that couples a shaft of a motor with a shaft of a rotary pump that is driven by the motor.

BACKGROUND ART

In related art, a shaft coupling apparatus in which two shafts are coaxially coupled is disclosed in PTL 1. More specifically, the two shafts are coupled by fastening a male screw into a female screw hole, the male screw being provided on a leading end of the shaft on an actuator side and the female screw hole being provided on an end surface of the shaft on a motor side. When the male screw is fastened into the female screw hole, an inner peripheral surface of a hollow cylindrical member, through which both of the shafts are inserted, is used as a guide.

CITATION LIST

Patent Literature

PTL 1
Japanese Patent Application Publication No. JP-A-2007-154944

SUMMARY OF INVENTION

Technical Problem

However, since it is necessary to rotate the shafts relatively to each other in order to fasten both of the shafts, assembly efficiency is not good. Further, with coupling by screw fastening, centering of both axes is difficult, and in some cases, there is a risk that the shafts cannot be coupled as a result of an outer peripheral surface of the shafts interfering with the inner peripheral surface of the hollow cylindrical member.

In addition, when fastening the male screw and the female screw hole that are provided at leading ends of the shafts, both of the shafts need to be rotated relatively to each other, and it becomes necessary to supply power to the motor to rotate the shaft on the motor side. Since a product is still in a manufacturing process at a stage when the shafts are fastened, the product is not in a form in which the power can be supplied to the motor, and providing wiring connections etc. to enable the power to be supplied to the motor causes the manufacturing process to become more complex.

In light of the foregoing, it is an object of the present invention to provide a shaft coupling apparatus that is capable of performing centering of both shafts easily and coupling the shafts without rotating both of them relatively to each other.

Solution to Problem

In order to achieve the above-described object, according to a first aspect of the present invention, there are provided a first leading end surface of the leading end of the first shaft, the first leading end surface forming a cylindrically-shaped first hole, the first hole having a central axis that is different from a rotational central axis of the first shaft and a second leading end surface of the leading end of the second shaft, the second leading end surface forming a cylindrically-shaped second hole, the second hole having a central axis that is different from a rotational central axis of the second shaft. The first and second shafts are coupled by pressure fitting a cross-sectionally circular pin in the first hole and loosely fitting the pin in the second hole, the pin corresponding to an inner diameter of the first hole and the second hole.

Since the first and second shafts are coupled by the cross-sectionally circular pin in this manner, both of the shafts are coupled by simply being abutted with each other. Further, since the pin is loosely fitted in one of the shafts, the shafts can be coupled easily and it is possible to perform centering of axes easily. In addition, a shaft coupling apparatus can be realized in which both the shafts do not need to be rotated relatively to each other in order to couple the first and second shafts.

According to a second aspect of the present invention, both the leading end of the first shaft and the leading end of the second shaft are disposed inside a bearing that commonly supports the first and second shafts.

In this manner, the centering of axes can be performed by a support surface of the bearing. With this type of apparatus, it is possible to perform the centering of axes more easily since a misalignment of shaft centers of separate bearings does not arise as may arise in a mode in which opposing ends of respective shafts are supported by the separate bearings. In addition, since the bearing that supports the first and second shafts is commonly used, it is possible to reduce the number of bearings compared with the mode in which the opposing ends of the respective shafts are supported by the separate bearings, and it becomes possible to reduce a size, in an axial direction, of a device that includes the shaft coupling apparatus.

According to a third aspect of the present invention, the bearing is a type that has an inner race and an outer race. Both the leading ends of the first and second shafts are disposed inside the inner race, and one of the first and second shafts is pressure fitted with respect to the inner race and the other of the first and second shafts is loosely fitted with respect to the inner race.

With this type of apparatus, since one of the first and second shafts is loosely fitted with respect to the common inner race, even if rotational central axes of the first shaft and the second shaft are displaced due to dimensional error etc, it is possible to inhibit pinching between the respective shafts and the pin or pinching between the respective shafts and the inner race, the pinching arising from the above-described displacement.

According to a fourth aspect of the present invention, the bearing is a type in which a rolling element is interposed between the inner race and the outer race, and the leading end of one of the first and second shafts that is pressure fitted to the inner race is pressure fitted to the inner race up to a position beyond a central position of the rolling element in a rotational central axis direction.

According to this, since the inner race, which is pressure fitted to the inner race, can receive a load of the shaft in a radial direction at the central position of the rolling element, it is possible to realize a more reliable and stable shaft support.

Note that the reference numbers in brackets for each of the above-described units are intended to show the relationship with the specific units described in the following embodiments.

DESCRIPTION OF EMBODIMENTS

Hereinafter, embodiments of the present invention will be explained based on the drawings.

First Embodiment

Figure 1:
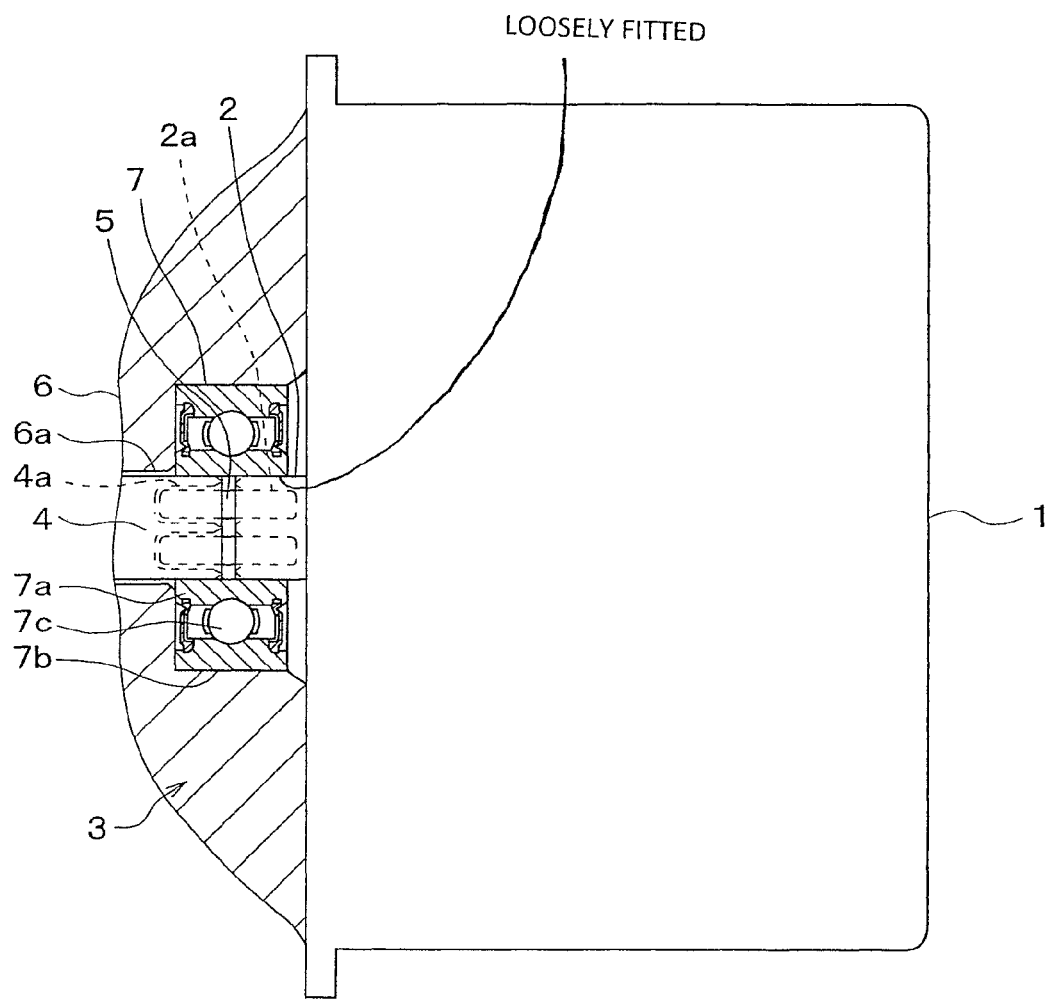
FIG. 1 is an enlarged partial cross-sectional diagram of a coupling portion to which a shaft coupling apparatus according to a first embodiment of the present invention is applied.

FIG. 1 is an enlarged partial cross-sectional diagram of a coupling portion to which a shaft coupling apparatus according to a first embodiment of the present invention is applied. Hereinafter, the shaft coupling apparatus according to the present embodiment will be explained in detail with reference to FIG. 1.

The shaft coupling apparatus shown in FIG. 1 is applied to a coupling between a shaft (a first shaft) 2 of a motor 1 and a shaft (a second shaft) 4 of an actuator 3 that is rotationally driven, such as a pump etc. The shaft 2 of the motor 1 is rotated through power supply to the motor 1, and opposing leading end portions of the shaft 2 and the shaft 4 of the actuator 3 are connected to each other via pins 5.

A hollow portion 6a, through which the shaft 4 is inserted, is formed inside a housing 6 of the actuator 3, and an inner diameter of the hollow portion 6a is enlarged on a side of the motor 1. A bearing 7 is provided in a section in which the inner diameter is enlarged, and the shaft 2 and the shaft 4 are commonly supported by a support surface of an inner race of the bearing 7. The bearing 7 has an inner race 7a and an outer race 7b, and it is structured by a type of ball bearing in which a plurality of rolling elements 7c are interposed between the inner race 7a and the outer race 7b. Then, centering of both of the shafts 2, 4 is performed by the support surface of the bearing 7, and both of the shafts 2, 4 are coupled inside the bearing 7.

Figure 2:
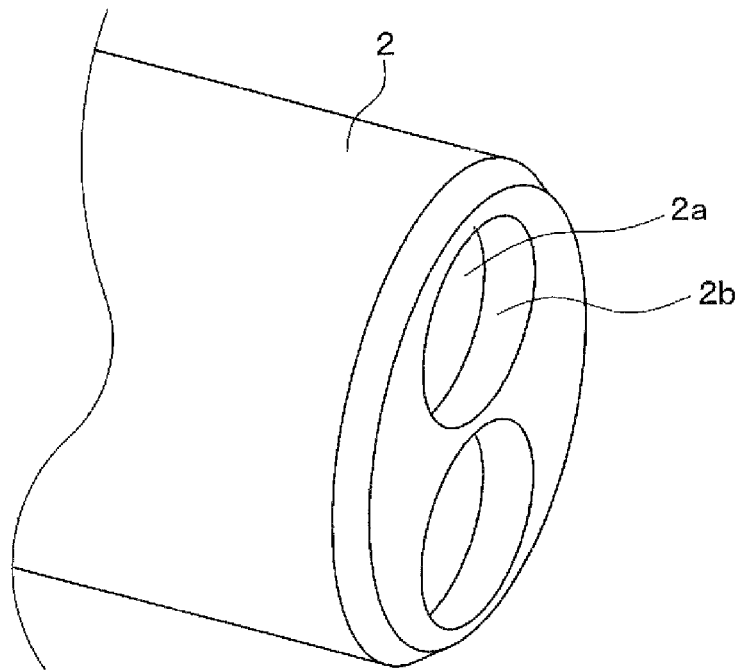
FIG. 2 is an enlarged perspective diagram of a leading end of a shaft, the leading end being on a side that is coupled.
Figure 3:
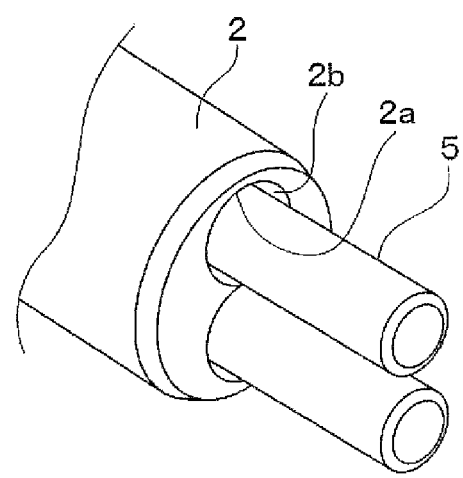
FIG. 3 is an enlarged perspective diagram showing a state in which pins have been installed in the shaft.
Figure 4:
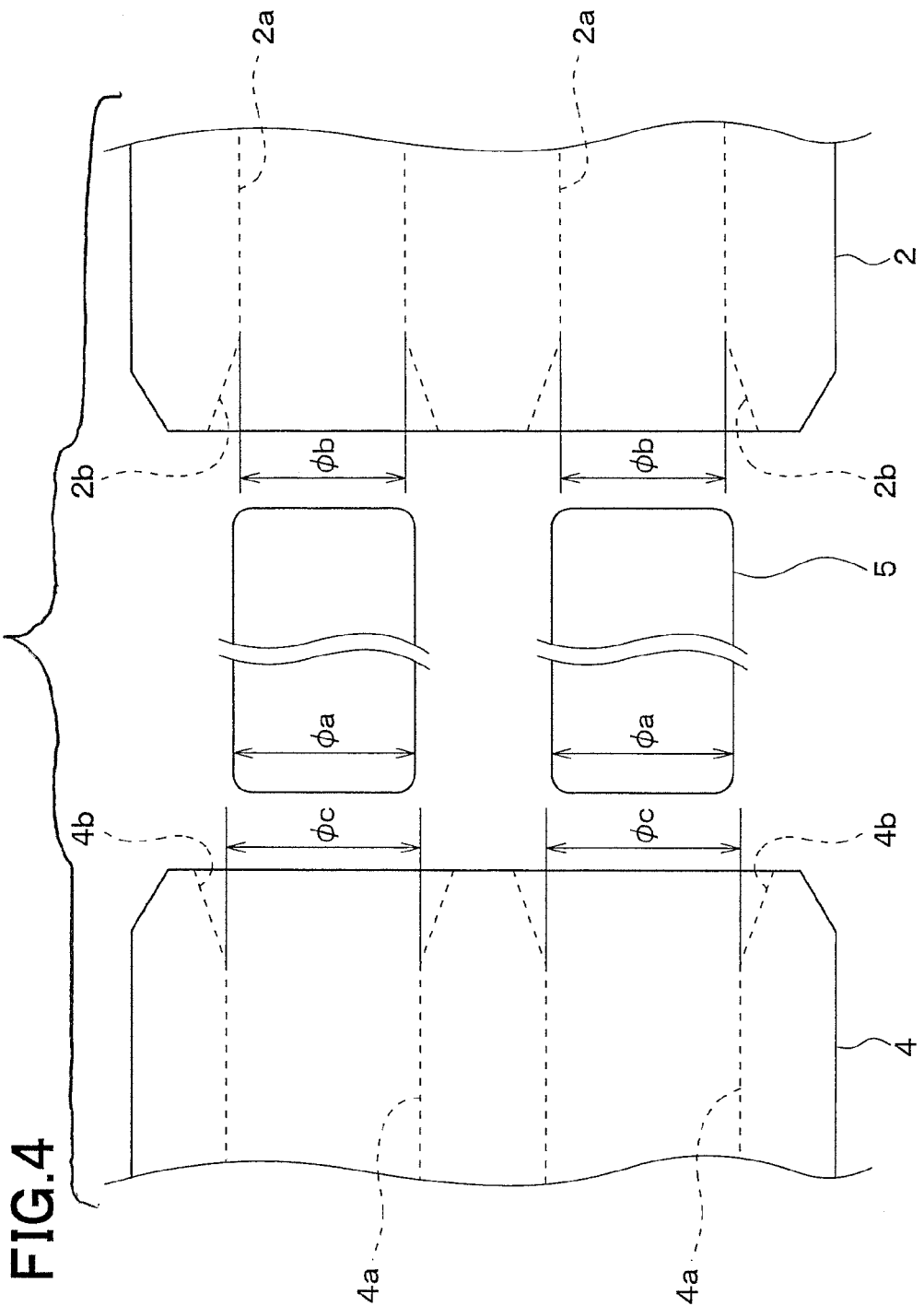
FIG. 4 is an enlarged diagram showing a state prior to a coupling between the shaft and a shaft and the pins.

FIG. 2 is an enlarged perspective diagram of the leading end of the shaft 2, the leading end being on a side that is coupled. FIG. 3 is an enlarged perspective diagram showing a state in which the pins 5 have been installed in the shaft 2. FIG. 4 is an enlarged diagram showing a state prior to a coupling between both of the shafts 2, 4 and the pins 5.

As shown in FIG. 2 and FIG. 4, two holes (first holes) 2a are formed on a leading end surface (a first leading end surface) of the shaft 2 of the motor side. The two holes 2a are cylindrically-shaped holes. Inner diameters of the two holes 2a and depths of the two holes 2a have substantially similar dimensions, and the two holes 2a are disposed while being displaced with respect to each other by regular intervals in a radial direction and a circumferential direction around a central axis of the shaft 2. Then, as shown in FIG. 3, the pins 5 are pressure fitted into the two holes 2a respectively, and the coupling of the shaft 2 and the shaft 4 is performed using the two pins 5. Taper portions 2b are provided at entrances of the two holes 2a, and inner diameters of the taper portions 2b are gradually enlarged toward the leading end of the shaft 2. As a result, a structure is provided in which the pins 5 can be easily inserted into the respective holes 2a.

Meanwhile, the leading end of the shaft 4 of the actuator 3 side is also substantially similar to the leading end of the shaft 2 of the motor 1 side More specifically, two holes (second holes) 4a that have a cylindrical shape are formed on a leading end surface (a second leading end surface) of the shaft 4. Inner diameters and depths of the two holes 4a have substantially similar dimensions. The two holes 4a are disposed while being displaced with respect to each other by regular intervals in the radial direction and the circumferential direction around a central axis of the shaft 4. Further, taper portions 4b are provided at entrances of the two holes 4a, and inner diameters of the taper portions 4b are gradually enlarged toward the leading end of the shaft 4. As a result, a structure is provided in which the pins 5 can be easily inserted into the respective holes 4a.

The pins 5 are cross-sectionally circular members corresponding to the holes 2a, 4a, and the pins 5 are structured as cylindrically-shaped members in the present embodiment. Both leading ends of the pins 5, namely the leading ends of the pins 5 that are inserted into the holes 2a, 4a of the shafts 2, 4, are rounded such that the pins 5 have a shape that is easily inserted into the holes 2a, 4a of the shafts 2, 4. An outer diameter $\phi a$ of portions of the pins 5 on which rounding processing is not performed is 2.5 mm, for example. The pins 5 are formed of an iron material, for example, and hardening processing is performed on the material to improve stiffness. For example, rollers that are used for general-purpose bearings may be used as the pins 5 of this type.

As shown in FIG. 4, a dimensional relationship between the outer diameter $\phi a$, an inner diameter $\phi b$ of the two holes 2a formed in the shaft 2, and an inner diameter $\phi c$ of the two holes 4a formed in the shaft 4, is $\phi b < \phi a < \phi c$. Here, the inner diameter $\phi b$ is the inner diameter of the hole 2a deeper than the taper portion 2b and the inner diameter $\phi c$ is the inner diameter of the hole 4a deeper than the taper portion 4b. As a result of this relationship, the pins 5 are pressure fitted into the holes 2a of the shaft 2 of the motor 1, and the pins 5 are loosely fitted into the holes 4a of the shaft 4 of the actuator 3. Therefore, at a time of the coupling, first, the pins 5 are pressure fitted into the holes 2a of the shaft 2 respectively, and then, the motor 1 and the actuator 3 are disposed such that the leading ends of both of the shafts 2, 4 oppose each other. After that, by inserting the pins 5, which are already pressure fitted into the holes 2a of the shaft 2, into the holes 4a of the shaft 4, both the shafts 2, 4 can be coupled via the pins 5.

Although the pins 5 may be pressure fitted into either the holes 2a of the shaft 2 or the holes 4a of the shaft 4 and may be loosely fitted into either the holes 2a of the shaft 2 or the holes 4a of the shaft 4, in the present embodiment, the pins 5 are pressure fitted into the holes 2a of the shaft 2 and loosely fitted into the holes 4a of the shaft 4 for reasons described below.

Since the motor 1 only plays a role in rotating the shaft 4 of the actuator 3 via the shaft 2, a load that is applied to the shaft 2 in the radial direction is small. On the other hand, in a case in which a rotary pump (a trochoid pump) etc. that is used for brake fluid pressure control is applied, for example, since a load from high-pressure brake fluid that is discharged by pump driving is applied to the shaft 4, a load applied to the shaft 4 in the radial direction is large. For this reason, in some cases, hardening processing is performed on the shaft 4 to improve stiffness, and it is difficult to pressure fit the pins 5 into the holes 4a since it is difficult to expand or contract the shaft 4 on which the hardening processing has been performed. Therefore, a structure is adopted in which the pins 5 are pressure fitted into the holes 2a of the shaft 2 on which there is no need to perform the hardening processing, and as a result, the pins 5 can be pressure fitted into the holes 2a of the shaft 2 more easily than into the holes 4a of the shaft 4.

Then, by coupling both of the shafts 2, 4 via the pins 5 in this manner, the centering of both of the shafts 2, 4 is accurately performed and a coupling apparatus is obtained in which the respective pins 5 are disposed at regular intervals in the radial direction and the circumferential direction around the central axes of the shafts 2, 4.

By using this type of shaft coupling apparatus, the shaft 2 of the motor 1 and the actuator 3 of the shaft 4 are coupled. Since both of the shafts 2, 4 are coupled via two of the cross-sectionally circular pins 5 in this manner, both of the shafts 2, 4 can be coupled simply by being abutted with each other. In addition, since one side is fitted loosely, it becomes possible to perform the coupling easily and to perform the centering easily. Further, since it is not necessary to rotate the shafts 2, 4 relatively to each other in order to couple the shafts 2, 4, it is possible to have a shaft coupling apparatus in which there is no need to supply power to the motor 1, for example, during a manufacturing process.

In addition, in the present embodiment, the opposing leading ends of the shaft 2 and the shaft 4 are provided inside the common bearing 7 (more precisely, inside the inner race 7a) that supports both of the shafts 2, 4. With this type of structure, it is possible to perform the centering more easily since a misalignment of shaft centers of separate bearings does not arise as may arise in a mode in which opposing ends of respective shafts are supported by separate bearings. In addition, since the bearing 7 that supports the shafts 2, 4 is commonly used, it is possible to reduce the number of bearings compared with the mode in which the opposing ends of the respective shafts are supported by the separate bearings, and it becomes possible to reduce, in the axial direction, a size of a device that includes the shaft coupling apparatus.

Further, according to the coupling apparatus of the present embodiment, it is possible to prolong a life of the shaft coupling apparatus. This will be explained based on FIG. 5A to FIG. 5C, in which cross-sectional diagrams of the shaft coupling apparatus according to the present embodiment and known shaft coupling apparatuses are shown.

Figure 5:
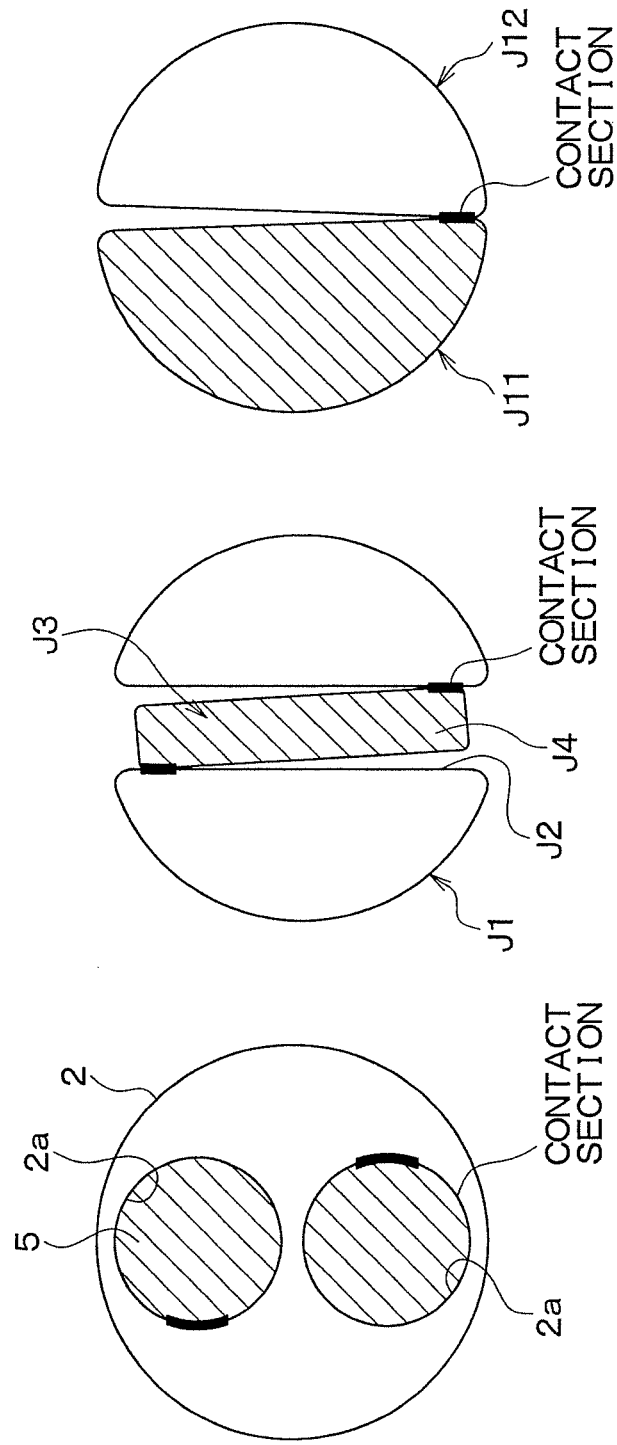
FIG. 5A shows a cross-sectional diagram of the shaft coupling apparatus according to the first embodiment.
FIG. 5B shows a cross-sectional diagram of a known shaft coupling apparatus.
FIG. 5C shows a cross-sectional diagram of a known shaft coupling apparatus.

FIG. 5A shows the shaft coupling apparatus of the present embodiment, and FIGS. 5B, 5C show the known shaft coupling apparatuses.

As shown in FIG. 5A, in the coupling apparatus according to the present embodiment, when the shaft 2 is rotated by driving the motor 1, its torque can be transmitted to the pins 5 via contact portions between the holes 2a and the pins 5. Further, the torque can be transmitted to the shaft 4 of the actuator 3 via contact portions between the pins 5 and the holes 4a. At this time, the coupling apparatus is such that the cylindrically-shaped pins 5 are inserted into the cylindrically-shaped holes 2a, 4a. For this reason, contact sections between inner wall surfaces of the cylindrically-shaped holes 2a, 4a and outer wall surfaces of the cylindrically-shaped pins 5 become contact portions (heavy-lined portions in FIG. 5A) between the holes 2a, 4a and the pins 5, and large areas can be secured as the contact portions due to the contact being made between curved surfaces with substantially similar curvatures and due to elastic deformation of the shafts 2, 4 and the pins 5 at the contact sections etc. As a result, the torque transmission is performed over the large areas, and contact pressure per unit area on contact surfaces that receive the torque transmission becomes small.

On the other hand, as shown in FIG. 5B, in the known shaft coupling apparatus, a slit J2 is provided in a diameter direction in a leading end of one shaft J1, and a convex portion J4 corresponding to the slit J2 is provided on a leading end of another shaft J3, the convex portion J4 being disposed inside the slit J2. The torque transmission is performed by having the slit J2 and the convex portion J4 engaged with each other. In addition, as shown in FIG. 5C, in a known shaft coupling apparatus, the torque transmission is performed by forming leading ends of both shafts J11, J12 in a cross-sectionally semicircular shape, and disposing the leading ends in a way in which they are displaced from each other by 180° and combined to form a circular shape.

However, in either of the coupling apparatuses shown in FIG. 5B, 5C, torque transmission sections, namely contact sections (heavy-lined portions in FIG. 5B) between the slit J2 and the convex portion J4 and a contact section (a heavy-lined portion in FIG. 5C) between the shafts J11 and J12 are linear contacts. As a result, the torque transmission is performed over small areas, and the contact pressure per unit area on the contact surfaces that receives the torque transmission becomes large.

Therefore, with such a coupling apparatus as that of the present embodiment, since it is possible to make the contact pressure smaller at a time of the torque transmission compared with the known coupling apparatuses, it is possible to prolong the life of the shaft coupling apparatus as a result of reduced stress. Particularly, since the pins 5 are loosely fitted with respect to the holes 4a, it is possible to make pinching (increased stress) unlikely to arise at a time of rotation and to prolong the life of the shaft coupling apparatus further. In addition, in the present embodiment, the outer race 7b of the bearing 7 is fixed to the actuator 3 by pressure fitting, and the shaft 4 is fixed to the inner race 7a by pressure fitting. Further, the shaft 2 of the motor 1 is loosely fitted in the inner race 7a. Therefore, even if rotational central axes of the shaft 2 and the shaft 4 are displaced due to dimensional error etc, it is possible to inhibit pinching between the respective shafts 2, 4 and the pins 5 or pinching between the respective shafts 2, 4 and the inner race 7a, the pinching arising from the above-described displacement. Therefore, it is possible to prolong the life of the shaft coupling apparatus.

Further, in the present embodiment, since the shaft coupling apparatus can be realized with a simple structure having the cylindrically-shaped holes 2a, 4a and the cylindrically-shaped pins 5, it is easy to process each portion that forms the coupling apparatus and it becomes possible to suppress product manufacturing costs. Particularly, with respect to the pins 5, since they can have a simple structure, namely a cylindrical shape, rollers that have high hardness and that are used for general-purpose bearings may be used as the pins 5, and it is thus possible to reduce component costs and to suppress the product manufacturing costs further.

In addition, although in the present embodiment the leading ends of both of the shafts 2, 4 are inserted into the inner race 7a of the bearing 7, it is preferable for a relationship between the bearing 7 and positions of the leading ends of both of the shafts 2, 4 to be as described below. This will be explained based on an enlarged partial cross-sectional diagram of the coupling portion of the shaft coupling apparatus, which is shown in FIG. 6.

Figure 6:
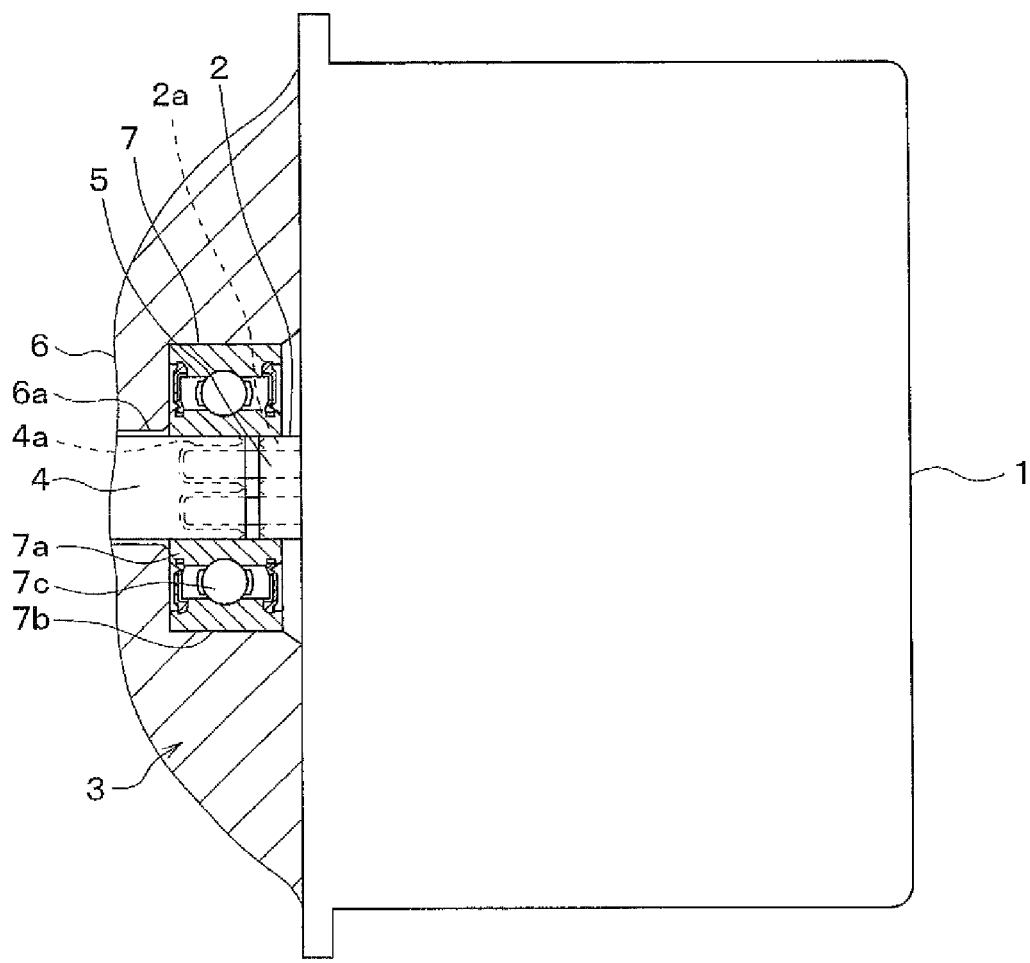
FIG. 6 is an enlarged partial cross-sectional diagram of the coupling portion of the shaft coupling apparatus.

As shown in FIG. 6, of the shaft 2 or shaft 4 that is pressure fitted to the bearing 7, namely, the shaft 4 of the actuator 3 side in the present embodiment, for example, the shaft 4 is preferably pressure fitted into the inner race 7a such that a leading end position of the shaft 4 exceeds a central position of the rolling elements 7c in a central rotational axis direction. With this kind of structure, since the inner race 7a can receive the load of the shaft 4 that is pressure fitted in the inner race 7a in the radial direction at the central position of the rolling elements 7c, it is possible to realize a more reliable and stable shaft support.

Other Embodiments

Although in the above-described embodiment, the rotary pump is described as an example of the actuator 3 that has the shaft 4 that is coupled with the shaft 2 of the motor 1, the actuator 3 is not limited to the rotary pump and the actuator 3 may be any device as long as it can be driven by the motor 1.

Further, although in the above-described embodiment, the shaft coupling apparatus is provided by the two holes 2a, 4a and the two pins 5, that quantity is arbitrary and the quantity of the holes 2a, 4a and the pin 5 may be only one, or may be three or more. Even in such cases, the coupling apparatus is acceptable as long as the central axes of the pins 5 are disposed at positions that are displaced from the central axes of both of the shafts 2, 4. Further, in a case in which there are a plurality of pins 5, it is preferable for the coupling apparatus to have the pins 5 that are disposed at regular intervals in the radial direction and the circumferential direction around the central axes of both of the shafts 2, 4, since the torque transmission between both of the shafts 2, 4 is performed evenly.

In addition, although in the above-described embodiment, the cylindrical shape is adopted as the simplest structure of the pins 5, the pins 5 are acceptable as long as at least the portions of the pins 5 that are inserted through the holes 2a, 4a of the shafts 2, 4 have a cross-sectionally circular shape having dimensions corresponding to the inner diameters of the holes 2a, 4a. For example, a portion of the pin 5 may be left between the leading end surfaces of both of the shafts 2, 4, and an outer diameter of that portion of the pin 5 may be enlarged.

Further, although in the above-described embodiment, a case in which the bearing 7 is structured by the ball bearing is described, the bearing 7 may be structured with a type of bearing in which a cylindrically-shaped roller is used as the rolling element.

The invention claimed is:

1. A shaft coupling apparatus in which a leading end of a first shaft and a leading end of a second shaft face each other and are coupled together such that rotational transmission is possible, the shaft coupling apparatus comprising:
a first leading end surface of the leading end of the first shaft, the first leading end surface forming a cylindrically-shaped first hole, the first hole having a central axis that is different from a rotational central axis of the first shaft;
a second leading end surface of the leading end of the second shaft, the second leading end surface forming a cylindrically-shaped second hole, the second hole having a central axis that is different from a rotational central axis of the second shaft;
a pin that is inserted through the first hole and the second hole respectively, portions of the pin that are inserted through the first hole and the second hole having a cross-sectionally circular shape that corresponds to an inner diameter of the first hole and of the second hole, and the pin being pressure fitted with respect to the first hole and loosely fitted with respect to the second hole; and
both the leading end of the first shaft and the leading end of the second shaft being disposed inside a bearing that commonly supports the first and second shafts, the bearing including a rolling element interposed between the inner race and the outer race.

2. The shaft coupling apparatus according to claim 1, wherein
the bearing is a type that has an inner race and an outer race, both the leading ends of the first and second shafts are disposed inside the inner race, and
one of the first and second shafts is pressure fitted with respect to the inner race.

3. The shaft coupling apparatus according to claim 2, wherein
the bearing is a type in which a rolling element is interposed between the inner race and the outer race, and
the leading end of one of the first and second shafts that is pressure fitted to the inner race is pressure fitted to the inner race up to a position beyond a central position of the rolling element in a rotational central axis direction.

4. A shaft coupling apparatus in which a leading end of a first shaft and a leading end of a second shaft face each other and are coupled together such that rotational transmission is possible, the shaft coupling apparatus comprising:
a first leading end surface of the leading end of the first shaft, the first leading end surface forming a cylindrically-shaped first hole, the first hole having a central axis that is different from a rotational central axis of the first shaft;
a second leading end surface of the leading end of the second shaft, the second leading end surface forming a cylindrically-shaped second hole, the second hole having a central axis that is different from a rotational central axis of the second shaft;
a pin that is inserted through the first hole and the second hole respectively, portions of the pin that are inserted through the first hole and the second hole having a cross-sectionally circular shape that corresponds to an inner diameter of the first hole and of the second hole, and the pin being pressure fitted with respect to the first hole and loosely fitted with respect to the second hole; and
both the leading end of the first shaft and the leading end of the second shaft being disposed inside a bearing that commonly supports the first and second shafts, the bearing including first and second parts that are separate from one another.

5. The shaft coupling apparatus according to claim 4, wherein the bearing has an inner race and an outer race, both leading ends of the first and second shafts are disposed inside the inner race, and one of the first and second shafts is pressure fitted with respect to the inner race.

6. The shaft coupling apparatus according to claim 4, wherein the bearing includes a rolling element interposed between an inner race and an outer race, one of the first and second shafts is pressure fitted to the inner race, and a leading end of the one of the first and second shafts that is pressure fitted to the inner race is pressure fitted to the inner race up to a position beyond a central position of the rolling element in a rotational central axis direction.

7. A shaft coupling apparatus in which a leading end of a first shaft and a leading end of a second shaft face each other and are coupled together such that rotational transmission is possible, the shaft coupling apparatus comprising:
a first leading end surface of the leading end of the first shaft, the first leading end surface forming a cylindrically-shaped first hole, the first hole having a central axis that is different from a rotational central axis of the first shaft;
a second leading end surface of the leading end of the second shaft, the second leading end surface forming a cylindrically-shaped second hole, the second hole having a central axis that is different from a rotational central axis of the second shaft;
a pin that is inserted through the first hole and the second hole respectively, portions of the pin that are inserted through the first hole and the second hole having a cross-sectionally circular shape that corresponds to an inner diameter of the first hole and of the second hole, and the pin being pressure fitted with respect to the first hole and loosely fitted with respect to the second hole;
wherein both the leading end of the first shaft and the leading end of the second shaft are disposed inside a bearing that commonly supports the first and second shafts, and the bearing is a type that has an inner race and an outer race;
wherein both the leading ends of the first and second shafts are disposed inside the inner race, and one of the first and second shafts is pressure fitted with respect to the inner race and the other of the first and second shafts is loosely fitted with respect to the inner race; and
wherein the bearing is a type in which a rolling element is interposed between the inner race and the outer race, and the leading end of one of the first and second shafts that is pressure fitted to the inner race is pressure fitted to the inner race up to a position beyond a central position of the rolling element in a rotational central axis direction.

* * * * *